US012647892B2

(12) United States Patent
Ly et al.

(10) Patent No.:  US 12,647,892 B2
(45) Date of Patent:       Jun. 2, 2026

(54) WAKE-UP SIGNAL CONFIGURATIONS VIA SIDELINK CHANNELS

(71) Applicant: QUALCOMM Incorporated, San Diego, CA (US)

(72) Inventors: Hung Dinh Ly, San Diego, CA (US); Krishna Kiran Mukkavilli, San Diego, CA (US); Ahmed Attia Abotabl, San Diego, CA (US)

(73) Assignee: QUALCOMM Incorporated, San Diego, CA (US)

( * ) Notice:      Subject to any disclaimer, the term of this patent is extended or adjusted under 35 U.S.C. 154(b) by 328 days.

(21) Appl. No.: 18/419,427

(22) Filed:      Jan. 22, 2024

(65)                Prior Publication Data
        US 2025/0240721 A1       Jul. 24, 2025

(51) Int. Cl.
        *H04W 76/14*        (2018.01)
        *H04W 8/00*         (2009.01)
        *H04W 52/02*        (2009.01)
        *H04W 72/40*        (2023.01)
(52) U.S. Cl.
        CPC ....... *H04W 52/0235* (2013.01); *H04W 8/005* (2013.01); *H04W 72/40* (2023.01); *H04W 76/14* (2018.02)
(58) Field of Classification Search
        CPC . H04W 52/0235; H04W 8/005; H04W 72/40; H04W 76/14; H04W 92/18; H04W 4/80; Y02D 30/70
        See application file for complete search history.

(56)                References Cited
                U.S. PATENT DOCUMENTS

2020/0053647 A1*  2/2020  Chae ................... H04W 56/001
2024/0224184 A1*  7/2024  Elshafie ............ H04W 52/0235
2025/0175901 A1*  5/2025  Cheng .................... H02J 50/80

FOREIGN PATENT DOCUMENTS

CN          117119563 A      11/2023
WO     WO-2023104291 A1 *   6/2023    ........ H04W 52/0229
WO     WO-2023168167 A1     9/2023

OTHER PUBLICATIONS

International Search Report and Written Opinion—PCT/US2024/059870—ISA/EPO—Mar. 18, 2025.

* cited by examiner

*Primary Examiner* — Ashley Shivers
(74) *Attorney, Agent, or Firm* — Holland & Hart LLP

(57)                ABSTRACT

Some communications systems include one or more cells that provide on-demand signaling for network energy saving (NES). In on-demand signaling, a user equipment (UE) in an idle or inactive state transmits a wake-up signal (WUS) to the cell (e.g., network entity) to request an on-demand signal. Examples of on-demand signals include a synchronization signal block (SSB) signal or a system information block (SIB) signal. For instance, a SIB1 may be transmitted when an uplink WUS is detected by the cell. The UE may utilize a WUS configuration to transmit the WUS to the cell. For instance, the WUS configuration may be utilized to perform time tracking, frequency tracking, or pathloss measurement to transmit the WUS. In some approaches, the WUS configuration may be carried by a physical broadcast channel (PBCH) from a cell.

20 Claims, 11 Drawing Sheets

PSCCH 405

PSSCH 410

Gap 415

PSFCH 420

425                              430

400

Figure 10:
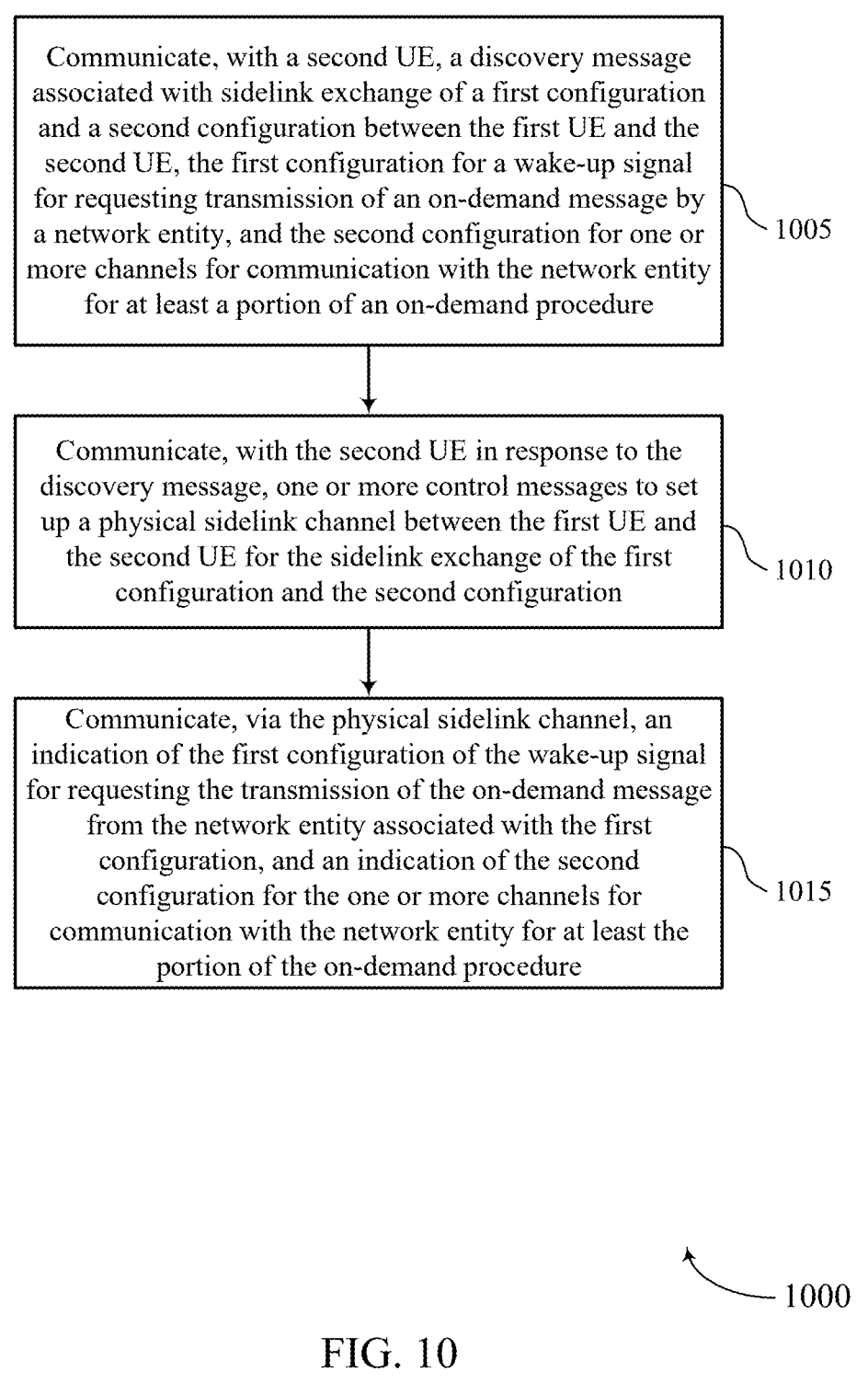

Communicate, with a second UE, a discovery message associated with sidelink exchange of a first configuration and a second configuration between the first UE and the second UE, the first configuration for a wake-up signal for requesting transmission of an on-demand message by a network entity, and the second configuration for one or more channels for communication with the network entity for at least a portion of an on-demand procedure

1005

Communicate, with the second UE in response to the discovery message, one or more control messages to set up a physical sidelink channel between the first UE and the second UE for the sidelink exchange of the first configuration and the second configuration

1010

Communicate, via the physical sidelink channel, an indication of the first configuration of the wake-up signal for requesting the transmission of the on-demand message from the network entity associated with the first configuration, and an indication of the second configuration for the one or more channels for communication with the network entity for at least the portion of the on-demand procedure

Figure 11:
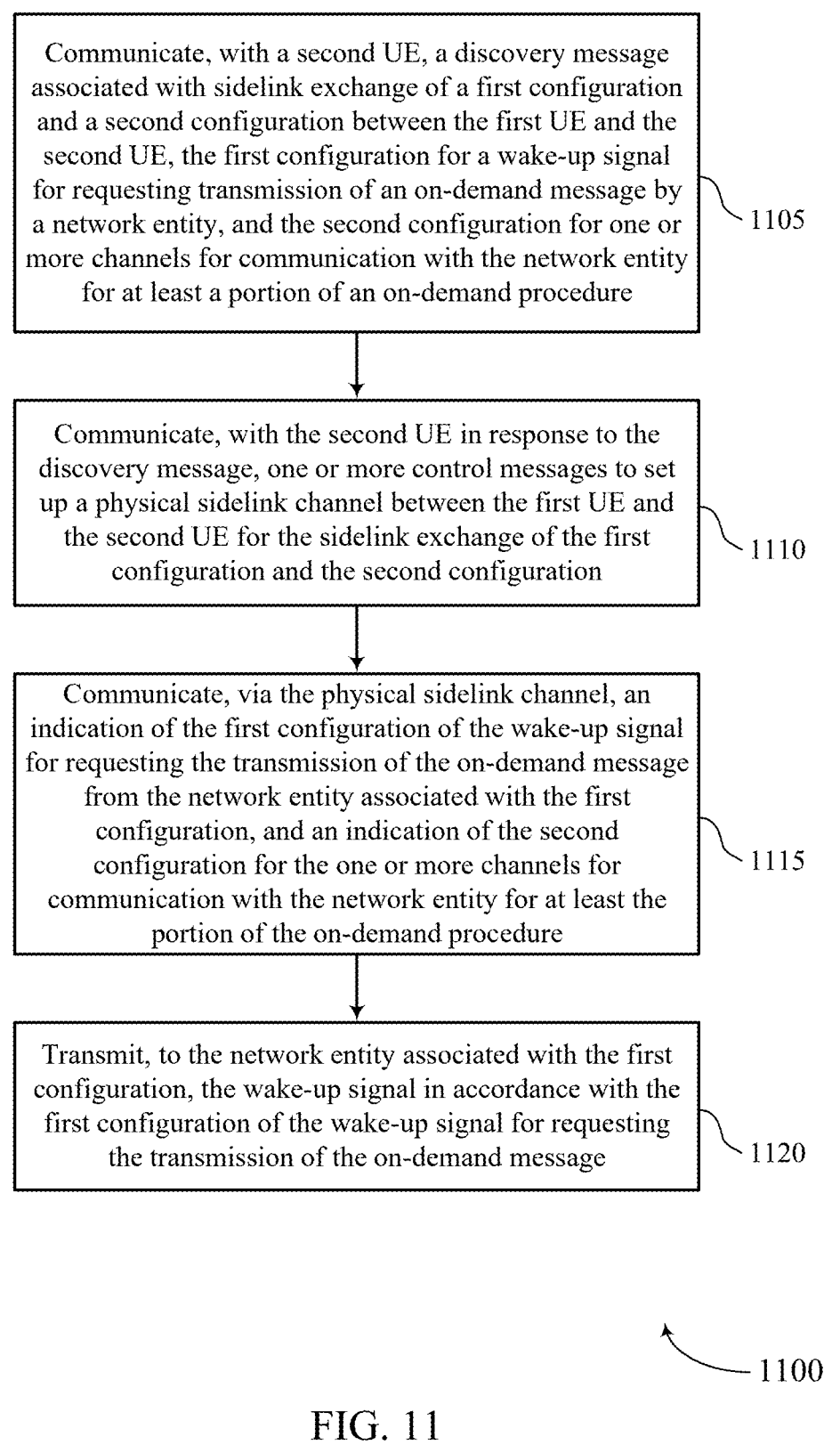

Communicate, with a second UE, a discovery message associated with sidelink exchange of a first configuration and a second configuration between the first UE and the second UE, the first configuration for a wake-up signal for requesting transmission of an on-demand message by a network entity, and the second configuration for one or more channels for communication with the network entity for at least a portion of an on-demand procedure ⟩ 1105

↓

Communicate, with the second UE in response to the discovery message, one or more control messages to set up a physical sidelink channel between the first UE and the second UE for the sidelink exchange of the first configuration and the second configuration ⟩ 1110

↓

Communicate, via the physical sidelink channel, an indication of the first configuration of the wake-up signal for requesting the transmission of the on-demand message from the network entity associated with the first configuration, and an indication of the second configuration for the one or more channels for communication with the network entity for at least the portion of the on-demand procedure ⟩ 1115

↓

Transmit, to the network entity associated with the first configuration, the wake-up signal in accordance with the first configuration of the wake-up signal for requesting the transmission of the on-demand message ⟩ 1120

WAKE-UP SIGNAL CONFIGURATIONS VIA SIDELINK CHANNELS

FIELD OF TECHNOLOGY

The following relates to wireless communications, including wake-up signal configurations via sidelink channels.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

Some communications systems include one or more cells that provide on-demand signaling for network energy saving (NES). In on-demand signaling, a user equipment (UE) in an idle or inactive state transmits a wake-up signal (WUS) to the cell (e.g., network entity) to request an on-demand signal. Examples of on-demand signals include a synchronization signal block (SSB) signal or a system information block (SIB) signal (e.g., SIB1). For instance, a SIB1 may be transmitted when an uplink WUS is detected by the cell (e.g., when no uplink WUS is detected, the network may perform SSB transmission and WUS detection). The UE may utilize a WUS configuration to transmit the WUS to the cell. For instance, the WUS configuration may be utilized to perform time tracking, frequency tracking, or pathloss measurement to transmit the WUS. In some approaches, the WUS configuration may be carried by a physical broadcast channel (PBCH) from a cell.

In some examples of the techniques described herein, a UE that has the WUS configuration may share the WUS configuration with one or more other UEs via a sidelink. For example, the WUS configuration may be carried via a physical sidelink control channel (PSCCH), a physical sidelink shared channel (PSSCH), or a physical sidelink broadcast channel (PSBCH). An enhanced detection or discovery procedure may be utilized in some approaches. For example, a UE may announce whether a broadcast or request is related to NES. In a first approach, the UE may send a presence announcement message indicating whether the UE has a WUS configuration. In a second approach, the UE may send a solicitation message indicating whether the UE is seeking (e.g., requesting) a WUS configuration. In some examples, an indication of whether a PSSCH carries the WUS configuration may be provided in a PSCCH. For instance, the indication may be applicable for groupcast sidelink scenarios, where a UE that is seeking a WUS configuration may decode (e.g., may only decode) the PSSCH when the PSSCH carries the WUS configuration. In some aspects where a first UE that shares a WUS configuration is in coverage, a second UE may determine the WUS resource or transmission timing based on timing used by the first UE to communicate with a cell.

Some examples of the techniques described herein may enable the sharing of configuration information (e.g., a WUS configuration or a channel configuration) between UEs, which may enable NES procedures to be carried out by one or more network entities. Additionally, or alternatively, some examples of the techniques described herein may enable a UE to obtain configuration information for accessing one or more network entities in an on-demand state without direct signaling from the one or more network entities.

A method for wireless communications by a first UE is described. The method may include communicating, with a second UE, a discovery message associated with sidelink exchange of a first configuration and a second configuration between the first UE and the second UE, the first configuration for a wake-up signal for requesting transmission of an on-demand message by a network entity, and the second configuration for one or more channels for communication with the network entity for at least a portion of an on-demand procedure, communicating, with the second UE in response to the discovery message, one or more control messages to set up a physical sidelink channel between the first UE and the second UE for the sidelink exchange of the first configuration and the second configuration, and communicating, via the physical sidelink channel, an indication of the first configuration of the wake-up signal for requesting the transmission of the on-demand message from the network entity associated with the first configuration, and an indication of the second configuration for the one or more channels for communication with the network entity for at least the portion of the on-demand procedure.

A first UE for wireless communications is described. The first UE may include one or more memories storing processor executable code, and one or more processors coupled with the one or more memories. The one or more processors may individually or collectively be operable to execute the code to cause the first UE to communicate, with a second UE, a discovery message associated with sidelink exchange of a first configuration and a second configuration between the first UE and the second UE, the first configuration for a wake-up signal for requesting transmission of an on-demand message by a network entity, and the second configuration for one or more channels for communication with the network entity for at least a portion of an on-demand procedure, communicate, with the second UE in response to the discovery message, one or more control messages to set up a physical sidelink channel between the first UE and the second UE for the sidelink exchange of the first configuration and the second configuration, and communicate, via the physical sidelink channel, an indication of the first configuration of the wake-up signal for requesting the transmission of the on-demand message from the network entity associated with the first configuration, and an indication of the second configuration for the one or more channels for communication with the network entity for at least the portion of the on-demand procedure.

Another first UE for wireless communications is described. The first UE may include means for communicating, with a second UE, a discovery message associated with sidelink exchange of a first configuration and a second configuration between the first UE and the second UE, the first configuration for a wake-up signal for requesting transmission of an on-demand message by a network entity, and the second configuration for one or more channels for communication with the network entity for at least a portion of an on-demand procedure, means for communicating, with the second UE in response to the discovery message, one or more control messages to set up a physical sidelink channel between the first UE and the second UE for the sidelink exchange of the first configuration and the second configuration, and means for communicating, via the physical sidelink channel, an indication of the first configuration of the wake-up signal for requesting the transmission of the on-demand message from the network entity associated with the first configuration, and an indication of the second configuration for the one or more channels for communication with the network entity for at least the portion of the on-demand procedure.

A non-transitory computer-readable medium storing code for wireless communications is described. The code may include instructions executable by one or more processors to communicate, with a second UE, a discovery message associated with sidelink exchange of a first configuration and a second configuration between the first UE and the second UE, the first configuration for a wake-up signal for requesting transmission of an on-demand message by a network entity, and the second configuration for one or more channels for communication with the network entity for at least a portion of an on-demand procedure, communicate, with the second UE in response to the discovery message, one or more control messages to set up a physical sidelink channel between the first UE and the second UE for the sidelink exchange of the first configuration and the second configuration, and communicate, via the physical sidelink channel, an indication of the first configuration of the wake-up signal for requesting the transmission of the on-demand message from the network entity associated with the first configuration, and an indication of the second configuration for the one or more channels for communication with the network entity for at least the portion of the on-demand procedure.

In some examples of the method, first UEs, and non-transitory computer-readable medium described herein, the indication of the first configuration may be received from the second UE and the method, apparatuses, and non-transitory computer-readable medium may include further operations, features, means, or instructions for transmitting, to the network entity associated with the first configuration, the wake-up signal in accordance with the first configuration of the wake-up signal for requesting the transmission of the on-demand message.

Some examples of the method, first UEs, and non-transitory computer-readable medium described herein may further include operations, features, means, or instructions for receiving the on-demand message from the network entity and transmitting, in response to the on-demand message, a random access signal to the network entity.

In some examples of the method, first UEs, and non-transitory computer-readable medium described herein, the on-demand message indicates a synchronization signal block or a system information block.

In some examples of the method, first UEs, and non-transitory computer-readable medium described herein, the physical sidelink channel may be a PSCCH, a PSSCH, or a PSBCH.

In some examples of the method, first UEs, and non-transitory computer-readable medium described herein, the discovery message indicates a capability to provide the first configuration of the wake-up signal associated with the network entity.

In some examples of the method, first UEs, and non-transitory computer-readable medium described herein, the discovery message may be communicated via a PSCCH, and the indication of the first configuration of the wake-up signal may be communicated via a PSSCH.

In some examples of the method, first UEs, and non-transitory computer-readable medium described herein, the discovery message indicates a request for the first configuration of the wake-up signal associated with the network entity.

In some examples of the method, first UEs, and non-transitory computer-readable medium described herein, the first configuration indicates a resource for the wake-up signal or a transmission timing of the wake-up signal based on a timing of the discovery message, of the one or more control messages, or of the indication of the first configuration of the wake-up signal.

In some examples of the method, first UEs, and non-transitory computer-readable medium described herein, the indication of the first configuration of the wake-up signal may be transmitted to the second UE or may be received from the second UE.

In some examples of the method, first UEs, and non-transitory computer-readable medium described herein, the second configuration indicates a random access channel (RACH) configuration or a physical downlink control channel (PDCCH) configuration.

BRIEF DESCRIPTION OF THE DRAWINGS

FIGS. 10 and 11 show flowcharts illustrating methods that support wake-up signal configurations via sidelink channels in accordance with one or more aspects of the present disclosure.

DETAILED DESCRIPTION

Figure 1:
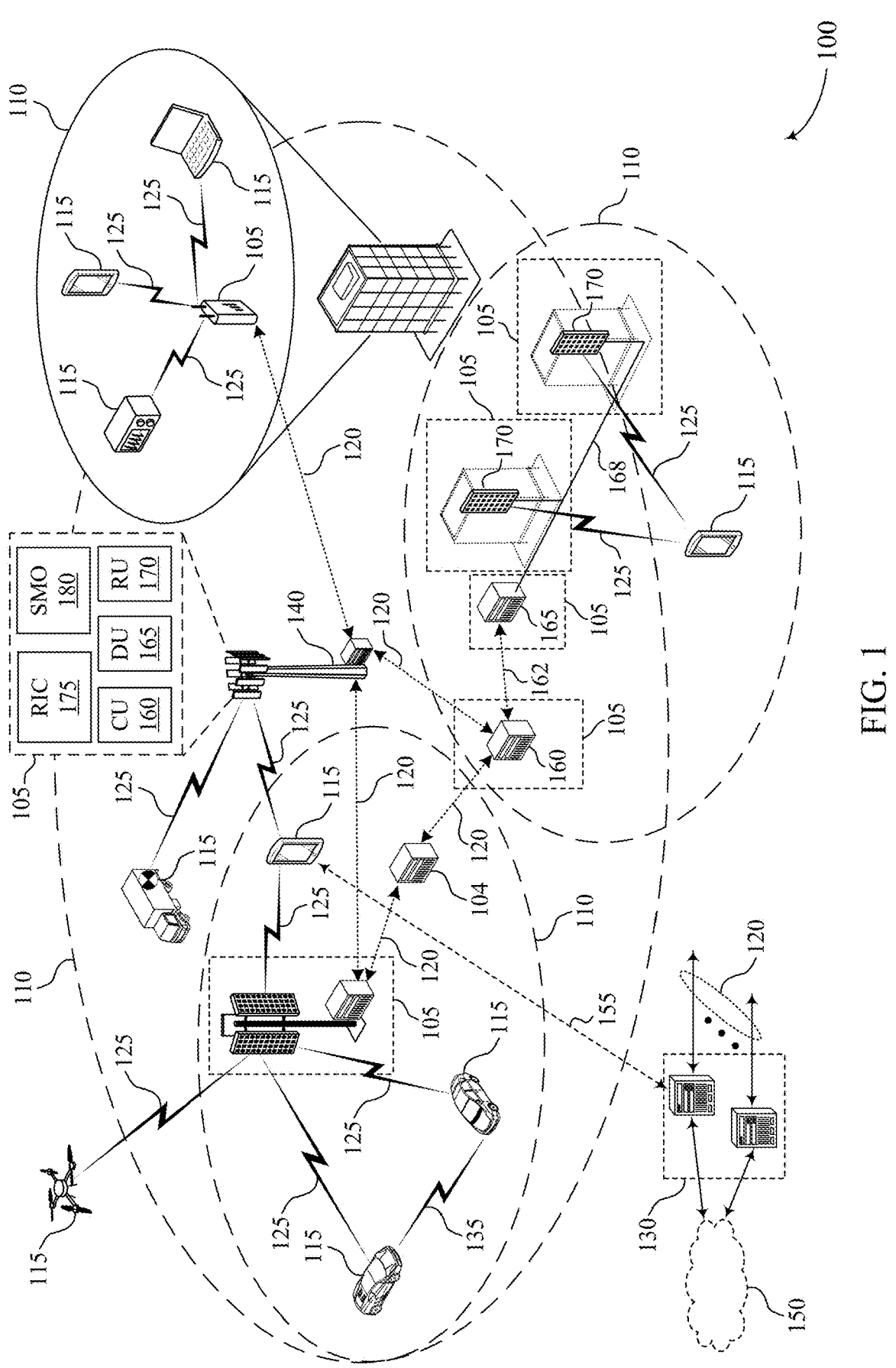
FIG. 1 shows an example of a wireless communications system that supports wake-up signal configurations via sidelink channels in accordance with one or more aspects of the present disclosure.

Some communications systems include one or more cells that provide on-demand signaling for network energy saving (NES). In on-demand signaling, a user equipment (UE) in an idle or inactive state transmits a wake-up signal (WUS) to the cell (e.g., network entity) to request an on-demand signal. In some approaches, a cell may not transmit the on-demand signal until detecting the WUS. Examples of on-demand signals include a synchronization signal block (SSB) signal or a system information block (SIB) signal (e.g., SIB1). For instance, a SIB1 may be transmitted when an uplink WUS is detected by the cell (e.g., when no uplink WUS is detected, the network may perform SSB transmission and WUS detection). The UE may utilize a WUS configuration to transmit the WUS to the cell. For instance, the WUS configuration may be utilized to perform time tracking, frequency tracking, or pathloss measurement to transmit the WUS. In some approaches, the WUS configuration may be carried by a physical broadcast channel (PBCH) from a cell. However, because the cell may not transmit a signal (e.g., SSB, SIB1, or PBCH) to the UE without a request, the UE may not have the WUS configuration to transmit the WUS. Without assistance from another source, it may be infeasible to transmit the WUS.

In some examples of the techniques described herein, a UE that has the WUS configuration may share the WUS configuration with one or more other UEs via a sidelink. In some approaches, a first UE may communicate, with a second UE, a discovery message associated with sidelink exchange of a first configuration or a second configuration between the first UE and the second UE. The first configuration may be associated with a WUS for requesting transmission of an on-demand message by a network entity. The second configuration may be utilized for one or more channels for communication with the network entity. For example, the second configuration may indicate one or more channels for communication with the network entity for at least a portion of an on-demand procedure (e.g., an on-demand SSB procedure, an on-demand SIB1 procedure, a random-access procedure, or a procedure including a signal exchange, among other examples). Associating the discovery message with the first configuration for a WUS may enable increased efficiency in the exchange of WUS configuration information. For instance, a discovery message may utilize a relatively small amount of data to indicate the availability of, or a request for, WUS configuration information or channel configuration information, which may allow avoid extra communications with other UEs that may not have (or are not requesting) the configuration information.

The first UE may communicate, with the second UE in response to the discovery message, one or more control messages to set up a physical sidelink channel between the first UE and the second UE for the sidelink exchange of the first configuration and the second configuration. Setting up the physical sidelink channel in response to the discovery information may enable avoiding wasting signaling resources between UEs with other UEs that may not have (or are not requesting) the configuration information.

The first UE may communicate, via the physical sidelink channel, an indication of the first configuration of the wake-up signal for requesting the transmission of the on-demand message from the network entity associated with the first configuration, or an indication of the second configuration (e.g., a second configuration for the one or more channels for communication with the network entity for at least the portion of an on-demand procedure). Communicating the first configuration or the second configuration may enable the transfer of configuration information (e.g., WUS configuration or channel configuration) without the involvement of a network entity that is performing NES, which may save energy. Transferring the configuration information may allow a UE to access a network entity using the WUS configuration or the channel configuration.

In some examples, the WUS configuration may be carried via a physical sidelink control channel (PSCCH), a physical sidelink shared channel (PSSCH), or a physical sidelink broadcast channel (PSBCH). An enhanced detection or discovery procedure may be utilized in some approaches. For example, a UE may announce whether a broadcast or request is related to NES. In a first approach, the UE may send a presence announcement message indicating whether the UE has a WUS configuration. In a second approach, the UE may send a solicitation message indicating whether the UE is seeking (e.g., requesting) a WUS configuration. In some examples, an indication of whether a PSSCH carries the WUS configuration may be provided in a PSCCH. For instance, the indication may be applicable for groupcast sidelink scenarios, where a UE that is seeking a WUS configuration may decode (e.g., may only decode) the PSSCH when the PSSCH carries the WUS configuration. Indicating, via the PSCCH, the presence of configuration information in the PSSCH may reduce the consumption of processing resources by allowing a UE to avoid decoding the PSSCH when the configuration information is not included. In some aspects where a first UE that shares a WUS configuration is in coverage, a second UE may determine the WUS resource or transmission timing based on timing used by the first UE to communicate with a cell. Utilizing the timing of the first UE to determine a WUS resource or transmission timing may allow a UE to obtain information for accessing a network entity that is performing a NES procedure without direct signaling from the network entity.

Some examples of the techniques described herein may enable the sharing of configuration information (e.g., a WUS configuration or a channel configuration) between UEs, which may enable NES procedures to be carried out by one or more network entities. Additionally, or alternatively, some examples of the techniques described herein may enable a UE to obtain configuration information for accessing one or more network entities in an on-demand state without direct signaling from the one or more network entities.

Aspects of the disclosure are initially described in the context of wireless communications systems. Aspects of the disclosure are also illustrated by and described with reference to a diagram illustrating scenarios for WUS configuration. Aspects of the disclosure are additionally illustrated by and described with reference to a diagram illustrating an example of channels. Aspects of the disclosure are also illustrated by and described with reference to a process flow. Aspects of the disclosure are further illustrated by and described with reference to apparatus diagrams, system diagrams, and flowcharts that relate to wake-up signal configurations via sidelink channels.

FIG. 1 shows an example of a wireless communications system 100 that supports wake-up signal configurations via sidelink channels in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support wake-up signal configurations via sidelink channels as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Some communications systems include one or more cells that provide on-demand signaling for NES. In on-demand signaling, a UE 115 in an idle or inactive state transmits a WUS to the cell (e.g., network entity 105) to request an on-demand signal. Examples of on-demand signals include an SSB signal or a SIB signal (e.g., SIB1). The UE 115 may utilize a WUS configuration to transmit the WUS to the cell. For instance, the WUS configuration may be utilized to perform time tracking, frequency tracking, or pathloss measurement to transmit the WUS. In some approaches, a cell may not transmit the on-demand signal until detecting the WUS. For instance, when no uplink WUS transmission occurs on an uplink WUS resource, a network entity 105 may not transmit an SSB, whereas a network entity 105 may transmit an SSB when an uplink WUS signal is detected.

Additionally, or alternatively, a SIB1 may be transmitted when an uplink WUS is detected by the cell. For instance, when no uplink WUS is detected, the network may perform SSB transmission and WUS detection. The SSB may be transmitted periodically, while the SIB1 transmission may be triggered by sending a WUS. In an example, an SSB may be transmitted by a network entity 105 indicating no SIB1 transmission, and other resources for communication may not be configured. A UE 115 may transmit an uplink WUS using an uplink WUS resource. The uplink WUS may be detected by a network entity 105 which may transmit an SSB indicating that a SIB1 transmission is available. The SIB1 may be transmitted, which may be utilized to configure resources for further communication. For example, random access channel (RACH) occasions may be configured, and the network entity 105 may attempt to detect a physical random access channel (PRACH).

In some approaches, configuration information may be carried by a PBCH from a cell. For example, a network entity 105 may transmit a master information block (MIB) that may include configuration information. However, the usable bits in an MIB may be limited, and may not carry enough information to indicate a meaningful uplink WUS configuration. Because a cell performing NES may transmit limited information or may not transmit a signal (e.g., SSB, SIB1, or PBCH) to a UE without a request, a UE may not have the WUS configuration to transmit the WUS. Without assistance from another source, it may be infeasible to transmit the WUS. Additionally, or alternatively, it may be infeasible to engage in an on-demand SSB or SIB1 procedure without assistance from another source.

On-demand SSB or SIB1 procedures may be accomplished via assistance from another source. For instance, on-demand SSB or SIB1 procedures may be supported for one or more idle UEs (e.g., a UE 115) if the UE(s) can obtain a WUS configuration from another source (e.g., another UE 115). In some examples of the techniques described herein, a UE 115 that has the WUS configuration may share the WUS configuration with one or more other UEs 115 via a sidelink. For example, the WUS configuration may be carried via a PSCCH, a PSSCH, or a PSBCH.

An enhanced detection or discovery procedure may be utilized in some approaches. For example, a UE 115 may announce whether a broadcast or request is related to NES. In a first approach, the UE 115 may send a presence announcement message indicating whether the UE 115 has a WUS configuration. In a second approach, the UE 115 may send a solicitation message indicating whether the UE 115 is seeking (e.g., requesting) a WUS configuration.

In some examples, a WUS configuration may be carried in a PSSCH. An indication of whether a PSSCH carries the WUS configuration may be provided in a PSCCH. For instance, the indication may be applicable for groupcast sidelink scenarios, where a UE 115 that is seeking a WUS configuration may decode (e.g., may only decode) the PSSCH when the PSSCH carries the WUS configuration.

In some aspects, timing for a WUS resource or transmission may be determined based on sidelink communication. In a scenario where a first UE 115 that shares a WUS configuration is in coverage, a second UE 115 may determine the WUS resource or transmission timing based on timing used by the first UE 115 to communicate with the second UE 115 or a cell.

Figure 2:
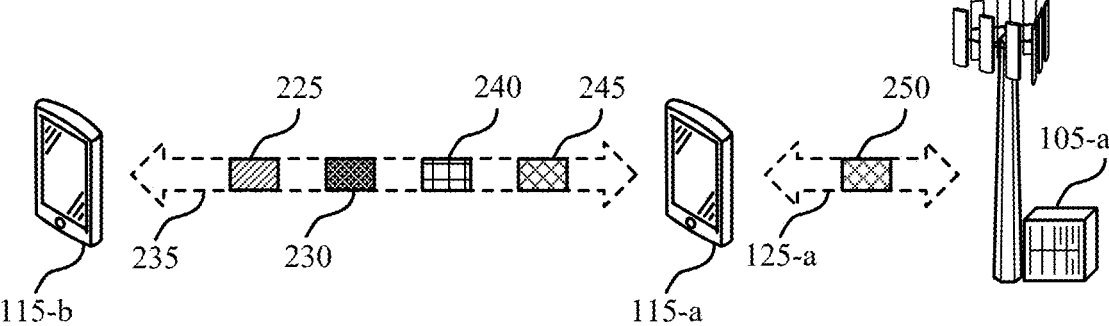
FIG. 2 shows an example of a wireless communications system that supports wake-up signal configurations via sidelink channels in accordance with one or more aspects of the present disclosure.

FIG. 2 shows an example of a wireless communications system 200 that supports wake-up signal configurations via sidelink channels in accordance with one or more aspects of the present disclosure. The wireless communications system

200 may implement aspects of or may be implemented by aspects of the wireless communications system 100. For example, the wireless communications system 200 includes a UE 115-*a* and a UE 115-*b*, which may examples of the UE 115 described with reference to FIG. 1. The wireless communications system 200 also includes a network entity 105-*a*, which may be an example of a network entity 105 as described with reference to FIG. 1.

The UE 115-*a* may communicate with the UE 115-*b* via a physical sidelink channel 235. As used herein, the term "communicate" and variations thereof may include signal transmission, signal reception, or a combination thereof. The physical sidelink channel 235 may be a communication link between the UE 115-*a* and the UE 115-*b* (without an intervening network entity, for instance). The physical sidelink channel 235 may be established to provide bidirectional communications between the UE 115-*a* and the UE 115-*b*. For example, the physical sidelink channel 235 may carry one or more signals from the UE 115-*a* to the UE 115-*b* or one or more signals from the UE 115-*b* to the UE 115-*a*. For instance, one or more signals communicated between the UE 115-*a* and the UE 115-*b* may include one or more control signals or one or more data signals. In some aspects, the communication link 135 described with reference to FIG. 1 may be an example of the physical sidelink channel 235. Examples of the physical sidelink channel 235 may include a PSCCH, PSSCH, PSBCH, or any combination thereof.

The UE 115-*a* may communicate with the network entity 105-*a* using a communication link 125-*a*, which may be an example of a communication link 125 described with reference to FIG. 1. The communication link 125-*a* may include a bi-directional link that enables both uplink and downlink network communications. For example, the UE 115-*a* may transmit uplink network transmissions, such as uplink control signals or uplink data signals, to the network entity 105-*a* using the communication link 125-*a*, and the network entity 105-*a* may transmit downlink network transmissions, such as downlink control signals or downlink data signals, to the UE 115-*a* using the communication link 125-*a*.

In some examples, the physical sidelink channel 235 may operate with or without the communication link 125-*a* (e.g., may operate independently from the communication link 125-*a* or may operate in conjunction with the communication link 125-*a*). In some cases, the UE 115-*a* may relay one or more downlink signals from the network entity 105-*a* to the UE 115-*b* via the physical sidelink channel 235 or may relay one or more uplink signals from the UE 115-*b* via the communication link 125-*a*. In some cases, the UE 115-*a* and the UE 115-*b* may communicate via the physical sidelink channel 235 independently of (or without operation of) the communication link 125-*a*.

The UE 115-*a* or the UE 115-*b* may perform a discovery procedure in accordance with one or more supported discovery approaches to establish the physical sidelink channel 235 (e.g., an NR sidelink). In a first discovery approach, a UE (e.g., UE 115-*b*) may transmit (e.g., broadcast) a discovery message 225 (e.g., a presence announcement) to one or more other UEs (e.g., UE 115-*a*). Any UE (e.g., UE 115-*a*) of the one or more UEs may respond with one or more control messages 230 to establish the physical sidelink channel 235. In a second discovery approach, a UE (e.g., UE 115-*a*) may transmit (e.g., broadcast) a discovery message 225 (e.g., a solicitation message) to one or more other UEs (e.g., UE 115-*b*). Any UE (e.g., UE 115-*b*) of the one or more UEs may respond with one or more control messages 230 to establish the physical sidelink channel 235.

In some examples of the techniques described herein, a discovery procedure may be enhanced to allow a UE (e.g., UE 115-*a* or UE 115-*b*) to transmit a signal (e.g., a broadcast signal or request) indicating that the transmission is related to NES or a WUS. In some approaches, a first UE (e.g., UE 115-*a* or UE 115-*b*) may communicate, with a second UE (e.g., UE 115-*b* or UE 115-*a*), a discovery message 225 associated with sidelink exchange of a first configuration 240 or a second configuration 245 between the first UE and the second UE.

In some examples, the discovery message 225 indicates a capability to provide the first configuration 240 of the WUS 250 associated with the network entity 105-*a*. In the first discovery approach, for instance, the UE 115-*b* may transmit a discovery message 225 (e.g., presence announcement) indicating that the UE 115-*b* has a first configuration 240 for a WUS 250 for requesting transmission of an on-demand message by the network entity 105-*a*.

In some examples, the discovery message 225 indicates a request for the first configuration 240 of the WUS 250 associated with the network entity 105-*a*. In the second discovery approach, for instance, the UE 115-*a* may transmit a discovery message 225 (e.g., request or solicitation message) indicating that the UE 115-*a* is requesting or seeking the first configuration 240 for a WUS 250 for requesting transmission of an on-demand message by a network entity 105-*a*. Examples of the first discovery approach and the second discovery approach are given with reference to FIG. 5.

The first UE (e.g., UE 115-*a* or UE 115-*b*) may communicate, with the second UE (e.g., UE 115-*b* or UE 115-*a*) based on the discovery message 225, one or more control messages 230 to set up the physical sidelink channel 235 between the first UE and the second UE for the sidelink exchange of the first configuration 240 or the second configuration 245. For example, the one or more control messages 230 may indicate resources to utilize for physical sidelink channel 235 communications, a request for the first configuration 240 or the second configuration 245, or one or more other messages.

The first UE (e.g., UE 115-*a* or UE 115-*b*) may communicate, via the physical sidelink channel 235, an indication of the first configuration 240 of the WUS 250 for requesting the transmission of the on-demand message from the network entity 105-*a* associated with the first configuration, or an indication of the second configuration 245 for signaling via the one or more channels with the network entity 105-*a*. The indication of the first configuration of the WUS is transmitted to the second UE or may be received from the second UE. For example, the UE 115-*a* may transmit the first configuration 240 and the second configuration 245 to the UE 115-*b*, or the UE 115-*b* may transmit the first configuration 240 and the second configuration 245 to the UE 115-*a*.

The first configuration 240 may be information for a WUS 250 for requesting transmission of an on-demand message by the network entity 105-*a*. For example, the first configuration 240 may indicate one or more resources (e.g., time resource(s), frequency resource(s), resource block(s), time slot(s), or signal(s), among other examples) to monitor to perform time tracking, frequency tracking, or pathloss measurement. The time tracking, frequency tracking, or pathloss measurement may be utilized (by UE 115-*a* or UE 115-*b*) to determine when to transmit the WUS 250, a frequency to utilize to transmit the WUS 250, or a transmit power to utilize to transmit the WUS 250.

In some aspects, the first configuration 240 may indicate a resource for the WUS 250 or a transmission timing of the WUS 250 based on a timing of the discovery message 225, of the one or more control messages 230, or of the indication of the first configuration 240 of the WUS 250. In a scenario where the UE 115-b that shares the first configuration 240 is in coverage of another cell (not shown in FIG. 2), the UE 115-a may determine the WUS resource or transmission timing based on timing used by the UE 115-b to communicate with the UE 115-a or the other cell. An example of resource or timing determination is provided with reference to FIG. 3.

The second configuration 245 may be information associated with (e.g., information for) one or more channels for communication with the network entity 105-a. For example, the second configuration 245 may indicate one or more channels for communication with the network entity 105-a for at least a portion of an on-demand procedure (e.g., an on-demand SSB procedure, an on-demand SIB1 procedure, a random-access procedure, or a procedure including a signal exchange, among other examples). In some aspects, the second configuration 245 may include configuration information to perform an on-demand SSB or SIB procedure. In some examples, the second configuration 245 may indicate a RACH configuration or a physical downlink control channel (PDCCH) configuration. For instance, the second configuration 245 may indicate a PDCCH configuration for Msg2 or Msg4 physical downlink shared channel (PDSCH) reception. For instance, the second configuration 245 may include information for the UE 115-a or the UE 115-b to engage in an on-demand SIB1 procedure or an on-demand SSB and SIB1 procedure. In some examples, the second configuration 245 may indicate a configuration for one or more signals other than the WUS 250. Additionally, or alternatively, the second configuration 245 may indicate a configuration for one or more channels other than one or more channels for the WUS 250.

In some aspects, the discovery message 225 may be communicated via a PSCCH and the indication of the first configuration 240 of the WUS 250 may be communicated via a PSSCH. For instance, an indication of whether a PSSCH carries the first configuration 240 may be provided in a PSCCH. A UE (e.g., UE 115-a or UE 115-b) that is seeking the first configuration 240 may decode the PSSCH when the PSSCH carries the first configuration 240 as indicated by the PSCCH. An example of a PSCCH and a PSSCH is given with reference to FIG. 4.

In some examples, the UE 115-a receives the indication of the first configuration 240 or the second configuration 245 from the UE 115-b. The UE 115-a may transmit, to the network entity 105-a associated with the first configuration 240 or the second configuration 245, the WUS 250 in accordance with the first configuration 240 of the WUS 250 for requesting the transmission of the on-demand message (e.g., SSB or SIB1) or in accordance with the second configuration 245 for signaling via the one or more channels with the network entity 105-a. For instance, the UE 115-a may perform time tracking, frequency tracking, or pathloss determination based on the first configuration 240 to transmit the WUS 250. Additionally, or alternatively, the UE 115-a may utilize a RACH configuration or a PDCCH configuration of the second configuration 245 to transmit the WUS 250.

The UE 115-a may receive the on-demand message from the network entity 105-a. In some aspects, the on-demand message may indicate an SSB or a SIB (e.g., SIB1). The UE 115-a may transmit, in response to the on-demand message, a random access signal to the network entity 105-a. For example, the UE 115-a may transmit a message (e.g., data) to the network entity 105-a in accordance with a random access procedure.

Some examples of the techniques described herein may be utilized in the context of an on-demand SSB and SIB (e.g., SIB1) procedure. The on-demand SSB and SIB procedure may be performed using a contention-free random access (CFRA) approach or a contention-based random access (CBRA) approach. In some examples, the second configuration 245 may indicate one or more channels for communication with the network entity 105-a for at least a portion of the on-demand SSB and SIB procedure (e.g., to transmit or receive one or more signals of the on-demand SSB and SIB procedure). For instance, the UE 115-a may utilize the RACH configuration or the PDCCH configuration (for Msg2 or Msg4 reception, for example) provided by the second configuration 245 to perform the SSB and SIB procedure.

In the on-demand SSB and SIB procedure with the CFRA approach, the UE 115-a may transmit the WUS 250 to the network entity 105-a (based on the first configuration 240, for instance). In some examples, the WUS 250 may be a PRACH (e.g., carrying a Msg1) utilized to request an SSB or SIB1. The network entity 105-a may transmit a response (e.g., a Msg2 or random access response (RAR) that includes or only includes a random access preamble identifier (RAPID)) to the UE 115-a. The network entity 105-a may transmit the on-demand message (e.g., SSB, SIB1, or a combination thereof) to the UE 115-b.

In the on-demand SSB and SIB procedure with the CBRA approach, the UE 115-a may transmit a Msg1 to the network entity 105-a. The network entity 105-a may transmit a Msg2 to the UE 115-a (in response to the Msg1). The UE 115-a may transmit the WUS 250 to the network entity 105-a (based on the first configuration 240, for instance). In some examples, the WUS 250 may be a PUSCH carrying a Msg3 (e.g., an RRCSsbSib1Request) utilized to request a SIB1. The network entity 105-a may transmit a Msg4 to the UE 115-a. The network entity 105-a may transmit an SSB and the on-demand message (e.g., SIB1) to the UE 115-b.

Some examples of the techniques described herein may be utilized in the context of an on-demand SIB (e.g., SIB1) procedure. The on-demand SIB procedure may be performed using a CFRA approach or a CBRA approach. In some examples, the second configuration 245 may indicate one or more channels for communication with the network entity 105-a for at least a portion of the on-demand SSB and SIB procedure (e.g., to transmit or receive one or more signals of the on-demand SIB procedure). For instance, the UE 115-a may utilize the RACH configuration or the PDCCH configuration (for Msg2 or Msg4 reception, for example) provided by the second configuration 245 to perform the SIB procedure.

In the on-demand SIB procedure with the CFRA approach, the UE 115-a may receive an SSB from the network entity 105-a. The UE 115-a may transmit the WUS 250 to the network entity 105-a (based on the first configuration 240, for instance). In some examples, the WUS 250 may be a PRACH (e.g., carrying a Msg1) utilized to request a SIB1. The network entity 105-a may transmit a response (e.g., a Msg2 or RAR that includes or only includes a RAPID) to the UE 115-a. The network entity 105-a may transmit the on-demand message (e.g., SIB1) to the UE 115-b.

In the on-demand SIB procedure with the CBRA approach, the UE 115-a may receive an SSB from the network entity 105-a. The UE 115-a may transmit a Msg1 to the network entity 105-*a*. The network entity 105-*a* may transmit a Msg2 to the UE 115-*a* (in response to the Msg1). The UE 115-*a* may transmit the WUS 250 to the network entity 105-*a* (based on the first configuration 240, for instance). In some examples, the WUS 250 may be a PUSCH carrying a Msg3 (e.g., an RRCSsbSib1Request) utilized to request a SIB1. The network entity 105-*a* may transmit a Msg4 to the UE 115-*a*. The network entity 105-*a* may transmit the on-demand message (e.g., SIB1) to the UE 115-*b*.

Figure 3:
FIG. 3 shows a diagram 300 illustrating an example of a first scenario and a second scenario that support wake-up signal configurations via sidelink channels in accordance with one or more aspects of the present disclosure.
Figure 3:
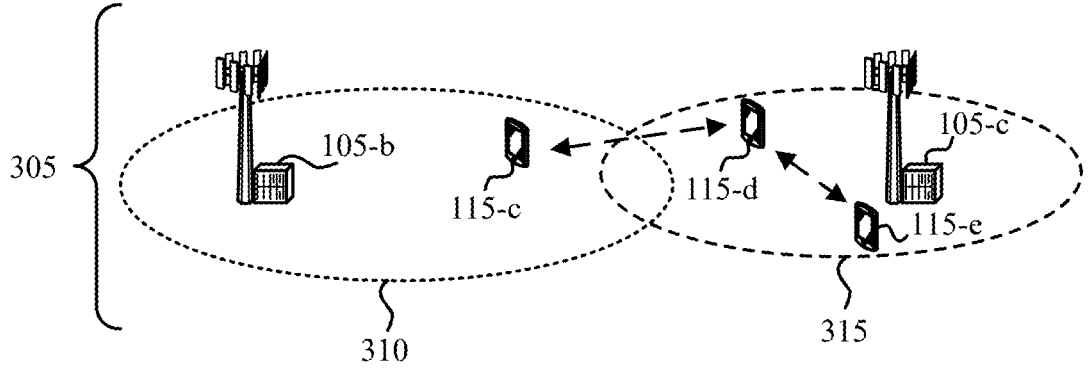
Figure 3:
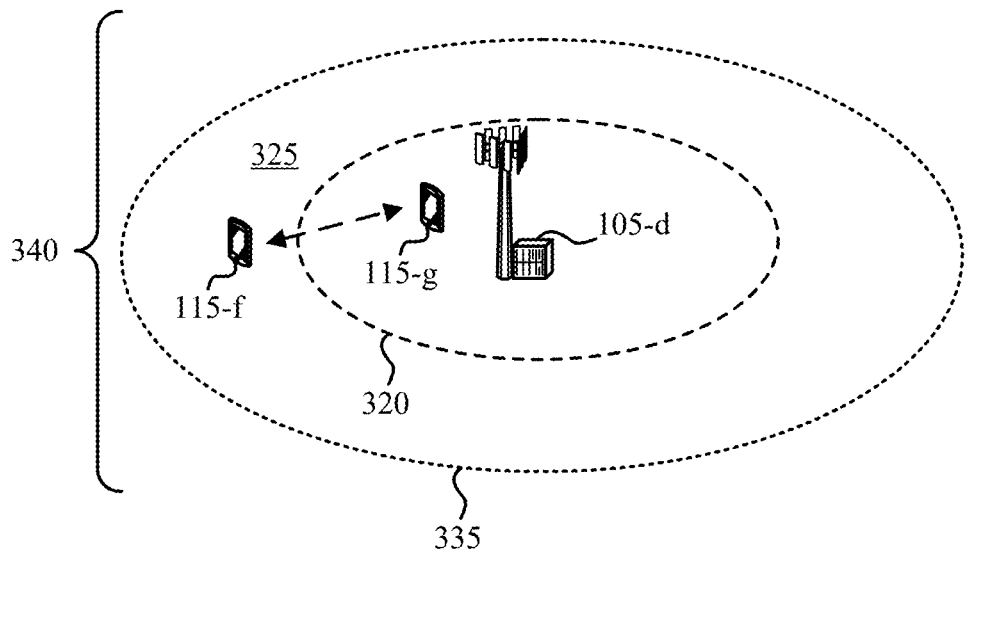

FIG. 3 shows a diagram 300 illustrating an example of a first scenario 305 and a second scenario 340 that support wake-up signal configurations via sidelink channels in accordance with one or more aspects of the present disclosure. The first scenario 305 and the second scenario 340 illustrate examples of UEs assisting to enable on-demand SSB or SIB (e.g., SIB1) procedures as described herein.

The first scenario 305 includes a network entity 105-*b*, a network entity 105-*c*, a UE 115-*c*, a UE 115-*d*, and a UE 115-*e*. The network entity 105-*b* or the network entity 105-*c* may be examples of the network entity 105 described with reference to FIG. 1. In some aspects, the network entity 105-*c* may be an example of the network entity 105-*a* described with reference to FIG. 2.

The network entity 105-*b* may provide an active (e.g., "always-on," non-NES, or non-on-demand) cell 310. For example, the network entity 105-*b* may provide SSB or SIB signaling without receiving a WUS. In some aspects, the on-demand cell 315 may be referred to as a Type-1 cell. The network entity 105-*a* may output (e.g., transmit) a WUS configuration (e.g., a first configuration 240) or a channel configuration (e.g., a second configuration 245) to the UE 115-*c*. For instance, the network entity 105-*a* may transmit a WUS configuration or a channel configuration that is applicable to the network entity 105-*c*.

The network entity 105-*c* may perform a NES procedure or may provide an on-demand cell 315. For example, the on-demand cell 315 may provide on-demand SSB or SIB (e.g., SIB1) signaling. In some aspects, the on-demand cell 315 may be referred to as a Type-2 cell. The UE 115-*d* or the UE 115-*e* may be unable to utilize the network entity 105-*c* without first transmitting a WUS to the network entity 105-*c*. For instance, the network entity 105-*c* may not provide an SSB, SIB1, or random access signaling without receiving a WUS.

In the first scenario 305, the UE 115-*c* may transmit a WUS configuration (e.g., first configuration 240) or a channel configuration (e.g., second configuration 245) to the UE 115-*d* via a sidelink 330 (e.g., PSCCH, PSSCH, or PSBCH) as described herein. The UE 115-*d* may utilize the WUS configuration or the channel configuration to communicate with the network entity 105-*c* as described herein.

In some examples, the UE 115-*d* may determine timing for a WUS resource or transmission based on sidelink communication. For instance, the UE 115-*c* may be in coverage. The UE 115-*d* may determine the WUS resource or transmission timing based on timing used by the UE 115-*c* to communicate with the UE 115-*d* or the active cell 310. For instance, the UE 115-*d* may transmit the WUS to the network entity 105-*c* based on the WUS resource or transmission timing.

In some examples, the UE 115-*d* may transmit the WUS configuration (e.g., first configuration 240) or the channel configuration (e.g., second configuration 245) to the UE 115-*e* via a sidelink 330 (e.g., PSCCH, PSSCH, or PSBCH) as described herein. The UE 115-*e* may utilize the WUS configuration or the channel configuration to communicate with the network entity 105-*c* as described herein.

The second scenario 340 includes a network entity 105-*d*, a UE 115-*f*, and a UE 115-*g*. The network entity 105-*d* may be an example of the network entity 105 described with reference to FIG. 1 or an example of the network entity 105-*a* described with reference to FIG. 2.

The network entity 105-*d* may provide an active (e.g., "always-on," non-NES, or non-on-demand) zone 320. For example, the network entity 105-*d* may provide SSB or SIB signaling without receiving a WUS in the active zone 320. The network entity 105-*a* may output (e.g., transmit) a WUS configuration (e.g., a first configuration 240) or a channel configuration (e.g., a second configuration 245) to the UE 115-*g*. For instance, the network entity 105-*a* may transmit a WUS configuration or a channel configuration that is applicable to the network entity 105-*d*.

The network entity 105-*d* may perform a NES procedure or may provide an on-demand zone 325. For example, the on-demand zone 325 may provide on-demand SSB or SIB (e.g., SIB1) signaling. The UE 115-*f*, while in the on-demand zone 325, may be unable to utilize the network entity 105-*d* without first transmitting a WUS to the network entity 105-*d*. For instance, the network entity 105-*d* may not provide an SSB, SIB1, or random access signaling to the UE 115-*f* without receiving a WUS from the UE 115-*f*.

In some aspects, the on-demand zone 325 may vary over time. When the network entity 105-*d* is not engaged in a NES procedure, the active zone 320 may be larger than illustrated. For instance, the active zone 320 may extend to an outer bound 335 of coverage (e.g., "always-on" SSB or SIB1 signaling may be provided to the outer bound 335) and the on-demand zone 325 may be reduced or non-existent in a first period. In a second period, when the network entity 105-*d* is engaged in a NES procedure (e.g., spatial or power reduction), the active zone 320 may be reduced and the on-demand zone 325 may occupy a region between the active zone 320 and the outer bound 335.

In the second scenario 340, the UE 115-*g* may transmit a WUS configuration (e.g., first configuration 240) or a channel configuration (e.g., second configuration 245) to the UE 115-*f* via a sidelink 330 (e.g., PSCCH, PSSCH, or PSBCH) as described herein. The UE 115-*f* may utilize the WUS configuration or the channel configuration to communicate with the network entity 105-*d* as described herein.

Figure 4:
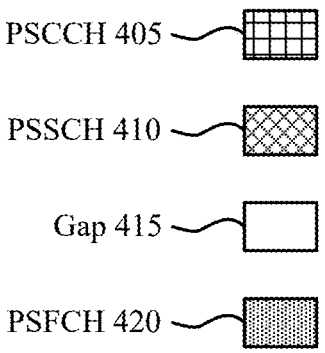
FIG. 4 shows an example of channels that support wake-up signal configurations via sidelink channels in accordance with one or more aspects of the present disclosure.
Figure 4:
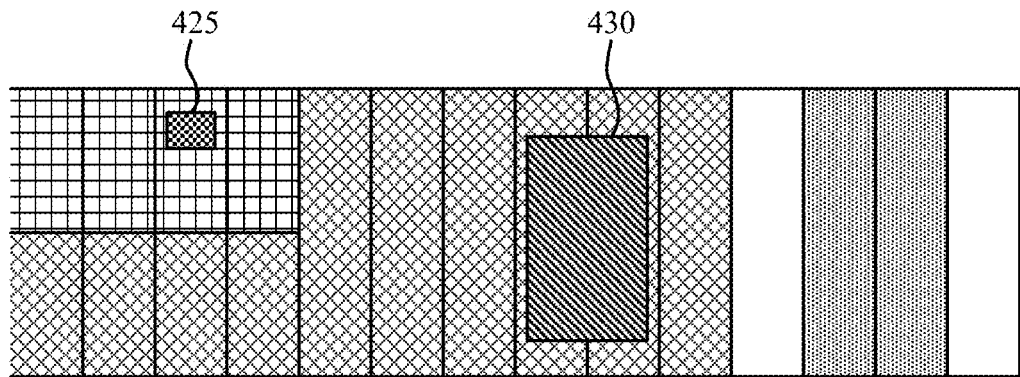

FIG. 4 shows an example of channels 400 that support wake-up signal configurations via sidelink channels in accordance with one or more aspects of the present disclosure. In particular, FIG. 4 illustrates examples of a PSCCH 405, a PSSCH 410, and a physical sidelink feedback channel (PSFCH) 420. In some aspects, the PSCCH 405 may carry an indication 425 (e.g., discovery message 225) that a WUS configuration 430 is provided in the PSSCH 410. For instance, an indication 425 of whether a PSSCH 410 carries the WUS configuration 430 (which may be an example of the first configuration 240 described with reference to FIG. 2) may be provided in the PSCCH 405. In some examples, a UE that is seeking (e.g., requesting or soliciting) the WUS configuration 430 may decode the PSSCH 410 when the PSSCH 410 carries the WUS configuration 430 as indicated by the PSCCH 405.

In some examples, a PSFCH 420 may be included in a sidelink transmission with the PSCCH 405 or the PSSCH 410. The PSFCH 420 may include feedback (e.g., HARQ information) for one or more sidelink transmissions. In some aspects, a gap 415 (e.g., time gap or guard period) may be situated between the PSSCH 410 and the PSFCH 420.

Figure 5:
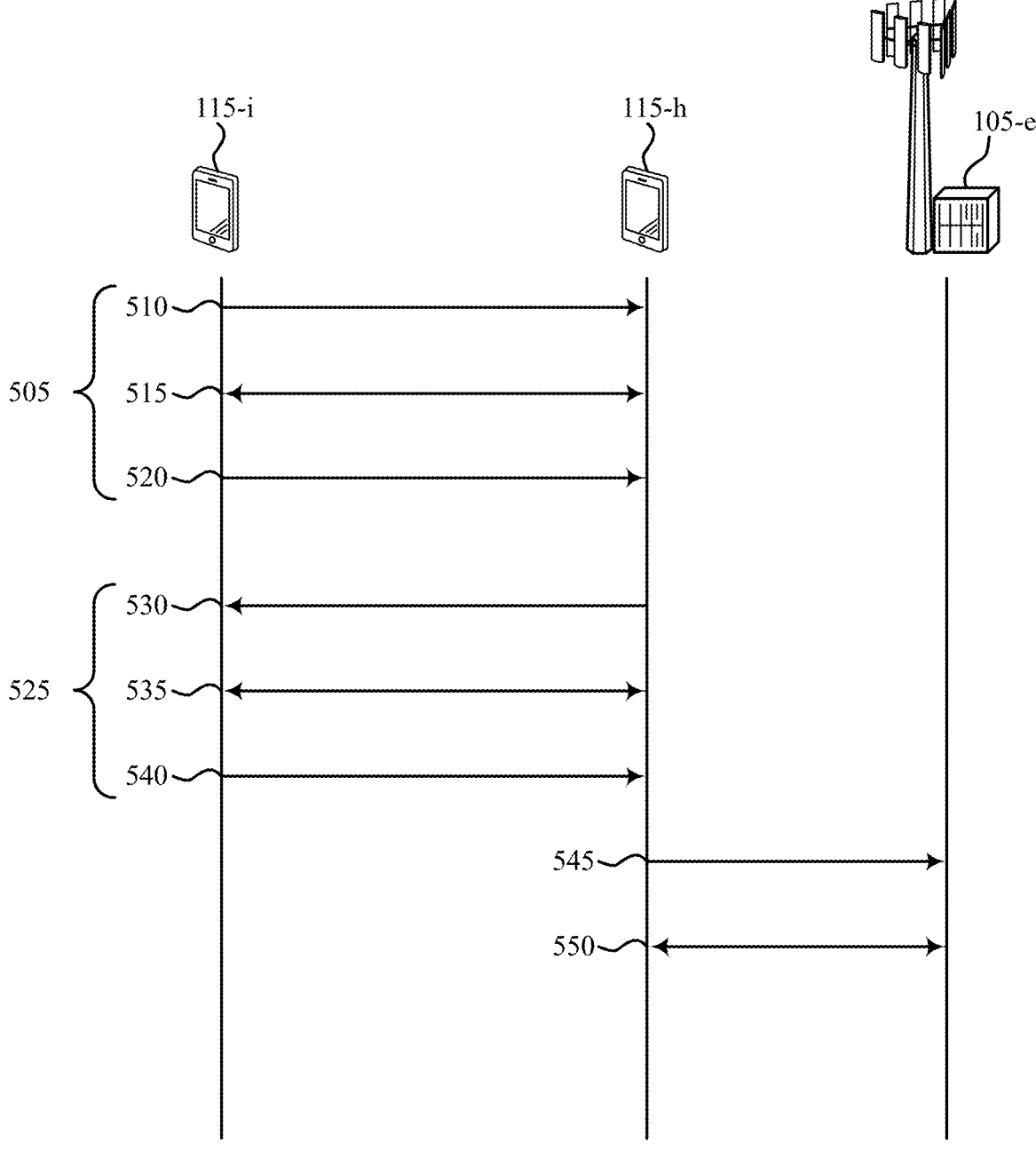
FIG. 5 shows an example of a process flow that supports wake-up signal configurations via sidelink channels in accordance with one or more aspects of the present disclosure.

FIG. 5 shows an example of a process flow 500 that supports wake-up signal configurations via sidelink channels in accordance with one or more aspects of the present disclosure. The process flow 500 may include a UE 115-*h* and a UE 115-*i*, which may be examples of one or more of the UEs 115, UE 115-*a*, UE 115-*b*, UE 115-*c*, UE 115-*d*, UE 115-*e*, UE 115-*f*, or UE 115-*g*, as described herein. The process flow 500 may also include a network entity 105-*e*, which may be an example of one or more of the network entities 105, network entity 105-*a*, network entity 105-*b*, network entity 105-*c*, or network entity 105-*d*, as described herein.

In the following description of the process flow 500, the operations between the network entity 105-*e*, the UE 115-*h*, and the UE 115-*i* may be transmitted in a different order than the example order shown, or the operations performed by the network entity 105-*e*, the UE 115-*h*, and the UE 115-*i* may be performed in different orders or at different times. Some operations may also be omitted from the process flow 500, or other operations may be added to the process flow 500. Further, although some operations or signaling may be shown to occur at different times for discussion purposes, these operations may actually occur at the same time or in overlapping time periods. In the example of FIG. 5, the UE 115-*h* or the UE 115-*i* may engage in a first discovery approach 505 or a second discovery approach 525.

In the first discovery approach 505, at 510, the UE 115-*i* may transmit (e.g., broadcast) a discovery message (e.g., a presence announcement) to one or more other UEs (e.g., UE 115-*h*). The discovery message may indicate that the UE 115-*i* has a WUS configuration or a channel configuration to access the network entity 105-*e*. For example, the UE 115-*i* may transmit a discovery message as described with reference to FIG. 2.

At 515, the UE 115-*h* may transmit one or more control messages to the UE 115-*i* to establish the physical sidelink channel. For instance, the UE 115-*h* may transmit a control message to set up the physical sidelink channel as described with reference to FIG. 2. In some examples, the UE 115-*i* may also transmit one or more control messages to establish the physical sidelink channel.

At 520, the UE 115-*i* may transmit a WUS configuration or a channel configuration. For instance, the UE 115-*i* may share a WUS configuration or a channel configuration as described with reference to FIG. 2.

In a second discovery approach 525, at 530, the UE 115-*h* may transmit (e.g., broadcast) a discovery message (e.g., a solicitation message) to one or more other UEs (e.g., UE 115-*i*). The discovery message may indicate that the UE 115-*i* is seeking or requesting a WUS configuration or a channel configuration to access the network entity 105-*e*. For instance, the UE 115-*h* may transmit a discovery message as described with reference to FIG. 2.

At 535, the UE 115-*i* may transmit one or more control messages to the UE 115-*h* to establish the physical sidelink channel. For instance, the UE 115-*i* may transmit a control message to set up the physical sidelink channel as described with reference to FIG. 2. In some examples, the UE 115-*h* may also transmit one or more control messages to establish the physical sidelink channel At 540, the UE 115-*i* may transmit a WUS configuration or a channel configuration. For instance, the UE 115-*i* may share a WUS configuration or a channel configuration as described with reference to FIG. 2.

At 545, the UE 115-*h* may transmit a WUS to the network entity 105-*e*. For example, the UE 115-*h* may transmit the WUS to the network entity based on the WUS configuration or the channel configuration as described with reference to FIG. 2.

At 550, the UE 115-*h* or the network entity 105-*e* may communicate one or more signals. For example, the UE 115-*h* or the network entity 105-*e* may transmit or receive one or more signals in accordance with an on-demand SSB and SIB (e.g., SIB1) procedure with a CFRA or a CBRA approach, or in accordance with a SIB (e.g., SIB1) procedure with a CFRA or a CBRA approach as described with reference to FIG. 2.

Figure 6:
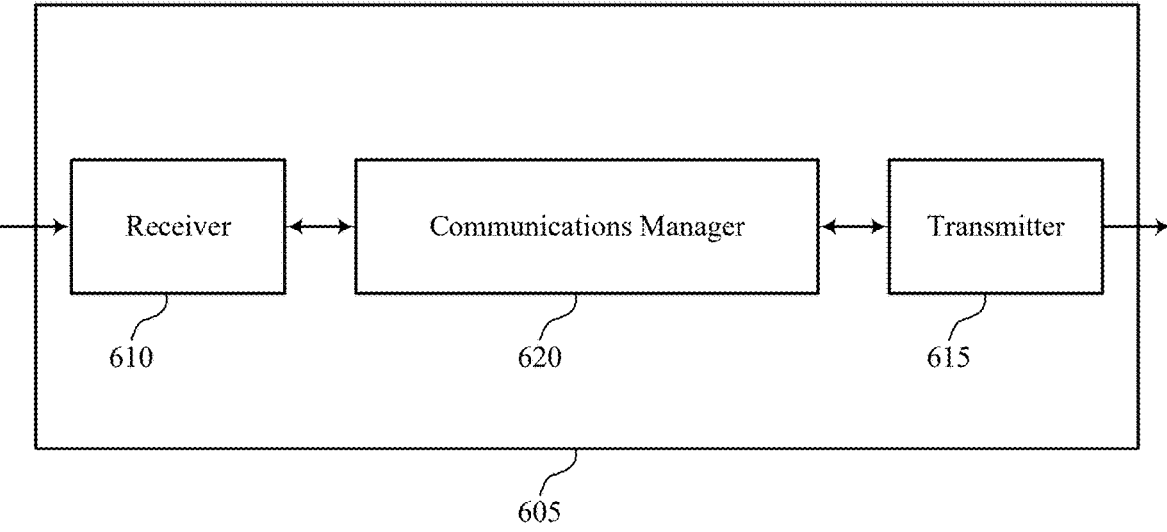
FIGS. 6 and 7 show block diagrams of devices that support wake-up signal configurations via sidelink channels in accordance with one or more aspects of the present disclosure.

FIG. 6 shows a block diagram 600 of a device 605 that supports wake-up signal configurations via sidelink channels in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to wake-up signal configurations via sidelink channels). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to wake-up signal configurations via sidelink channels). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of wake-up signal configurations via sidelink channels as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for communicating, with a second UE, a discovery message associated with sidelink exchange of a first configuration and a second configuration between the first UE and the second UE, the first configuration for a wake-up signal for requesting transmission of an on-demand message by a network entity, and the second configuration for one or more channels for communication with the network entity for at least a portion of an on-demand procedure. The communications manager 620 is capable of, configured to, or operable to support a means for communicating, with the second UE in response to the discovery message, one or more control messages to set up a physical sidelink channel between the first UE and the second UE for the sidelink exchange of the first configuration and the second configuration. The communications manager 620 is capable of, configured to, or operable to support a means for communicating, via the physical sidelink channel, an indication of the first configuration of the wake-up signal for requesting the transmission of the on-demand message from the network entity associated with the first configuration, and an indication of the second configuration for the one or more channels for communication with the network entity for at least the portion of the on-demand procedure.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for reduced processing, reduced power consumption, or more efficient utilization of communication resources.

Figure 7:
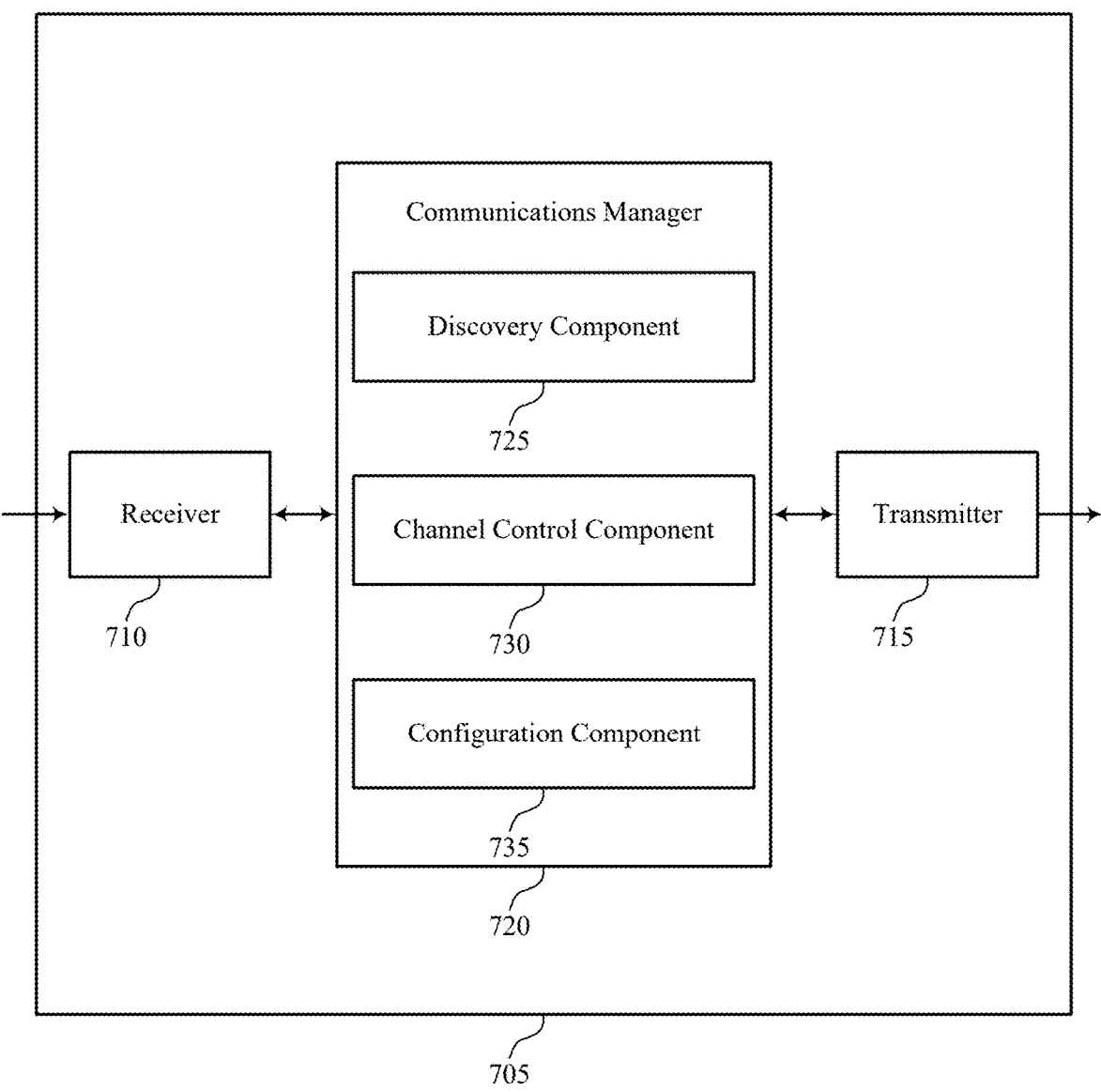

FIG. 7 shows a block diagram 700 of a device 705 that supports wake-up signal configurations via sidelink channels in accordance with one or more aspects of the present disclosure. The device 705 may be an example of aspects of a device 605 or a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to wake-up signal configurations via sidelink channels). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to wake-up signal configurations via sidelink channels). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of wake-up signal configurations via sidelink channels as described herein. For example, the communications manager 720 may include a discovery component 725, a channel control component 730, a configuration component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The discovery component 725 is capable of, configured to, or operable to support a means for communicating, with a second UE, a discovery message associated with sidelink exchange of a first configuration and a second configuration between the first UE and the second UE, the first configuration for a wake-up signal for requesting transmission of an on-demand message by a network entity, and the second configuration for one or more channels for communication with the network entity for at least a portion of an on-demand procedure. The channel control component 730 is capable of, configured to, or operable to support a means for communicating, with the second UE in response to the discovery message, one or more control messages to set up a physical sidelink channel between the first UE and the second UE for the sidelink exchange of the first configuration and the second configuration. The configuration component 735 is capable of, configured to, or operable to support a means for communicating, via the physical sidelink channel, an indication of the first configuration of the wake-up signal for requesting the transmission of the on-demand message from the network entity associated with the first configuration, and an indication of the second configuration for the one or more channels for communication with the network entity for at least the portion of the on-demand procedure.

Figure 8:
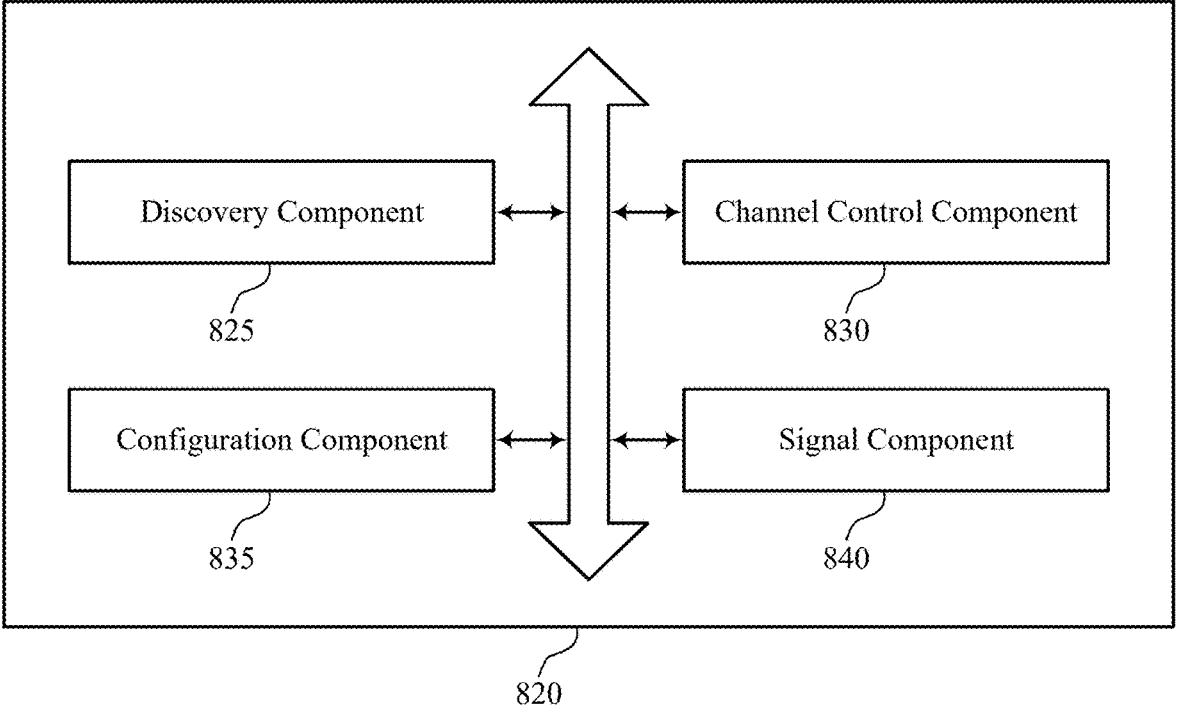
FIG. 8 shows a block diagram of a communications manager that supports wake-up signal configurations via sidelink channels in accordance with one or more aspects of the present disclosure.

FIG. 8 shows a block diagram 800 of a communications manager 820 that supports wake-up signal configurations via sidelink channels in accordance with one or more aspects of the present disclosure. The communications manager 820 may be an example of aspects of a communications manager 620, a communications manager 720, or both, as described herein. The communications manager 820, or various components thereof, may be an example of means for performing various aspects of wake-up signal configurations via sidelink channels as described herein. For example, the communications manager 820 may include a discovery component 825, a channel control component 830, a configuration component 835, a signal component 840, or any combination thereof. Each of these components, or components or subcomponents thereof (e.g., one or more processors, one or more memories), may communicate, directly or indirectly, with one another (e.g., via one or more buses).

The communications manager 820 may support wireless communications in accordance with examples as disclosed herein. The discovery component 825 is capable of, configured to, or operable to support a means for communicating, with a second UE, a discovery message associated with sidelink exchange of a first configuration and a second configuration between the first UE and the second UE, the first configuration for a wake-up signal for requesting transmission of an on-demand message by a network entity, and the second configuration for one or more channels for communication with the network entity for at least a portion of an on-demand procedure. The channel control component 830 is capable of, configured to, or operable to support a means for communicating, with the second UE in response to the discovery message, one or more control messages to set up a physical sidelink channel between the first UE and the second UE for the sidelink exchange of the first configuration and the second configuration. The configuration component 835 is capable of, configured to, or operable to support a means for communicating, via the physical sidelink channel, an indication of the first configuration of the wake-up signal for requesting the transmission of the on-demand message from the network entity associated with the first configuration, and an indication of the second configuration for the one or more channels for communication with the network entity for at least the portion of the on-demand procedure.

In some examples, the indication of the first configuration is received from the second UE, and the signal component 840 is capable of, configured to, or operable to support a means for transmitting, to the network entity associated with the first configuration, the wake-up signal in accordance with the first configuration of the wake-up signal for requesting the transmission of the on-demand message.

In some examples, the signal component 840 is capable of, configured to, or operable to support a means for receiving the on-demand message from the network entity. In some examples, the signal component 840 is capable of, configured to, or operable to support a means for transmitting, in response to the on-demand message, a random access signal to the network entity.

In some examples, the on-demand message indicates a synchronization signal block or a system information block.

In some examples, the physical sidelink channel is a PSCCH, a PSSCH, or a PSBCH.

In some examples, the discovery message indicates a capability to provide the first configuration of the wake-up signal associated with the network entity.

In some examples, the discovery message is communicated via a PSCCH, and the indication of the first configuration of the wake-up signal is communicated via a PSSCH.

In some examples, the discovery message indicates a request for the first configuration of the wake-up signal associated with the network entity.

In some examples, the first configuration indicates a resource for the wake-up signal or a transmission timing of the wake-up signal based on a timing of the discovery message, of the one or more control messages, or of the indication of the first configuration of the wake-up signal.

In some examples, the indication of the first configuration of the wake-up signal is transmitted to the second UE or is received from the second UE.

In some examples, the second configuration indicates a RACH configuration or a PDCCH configuration.

Figure 9:
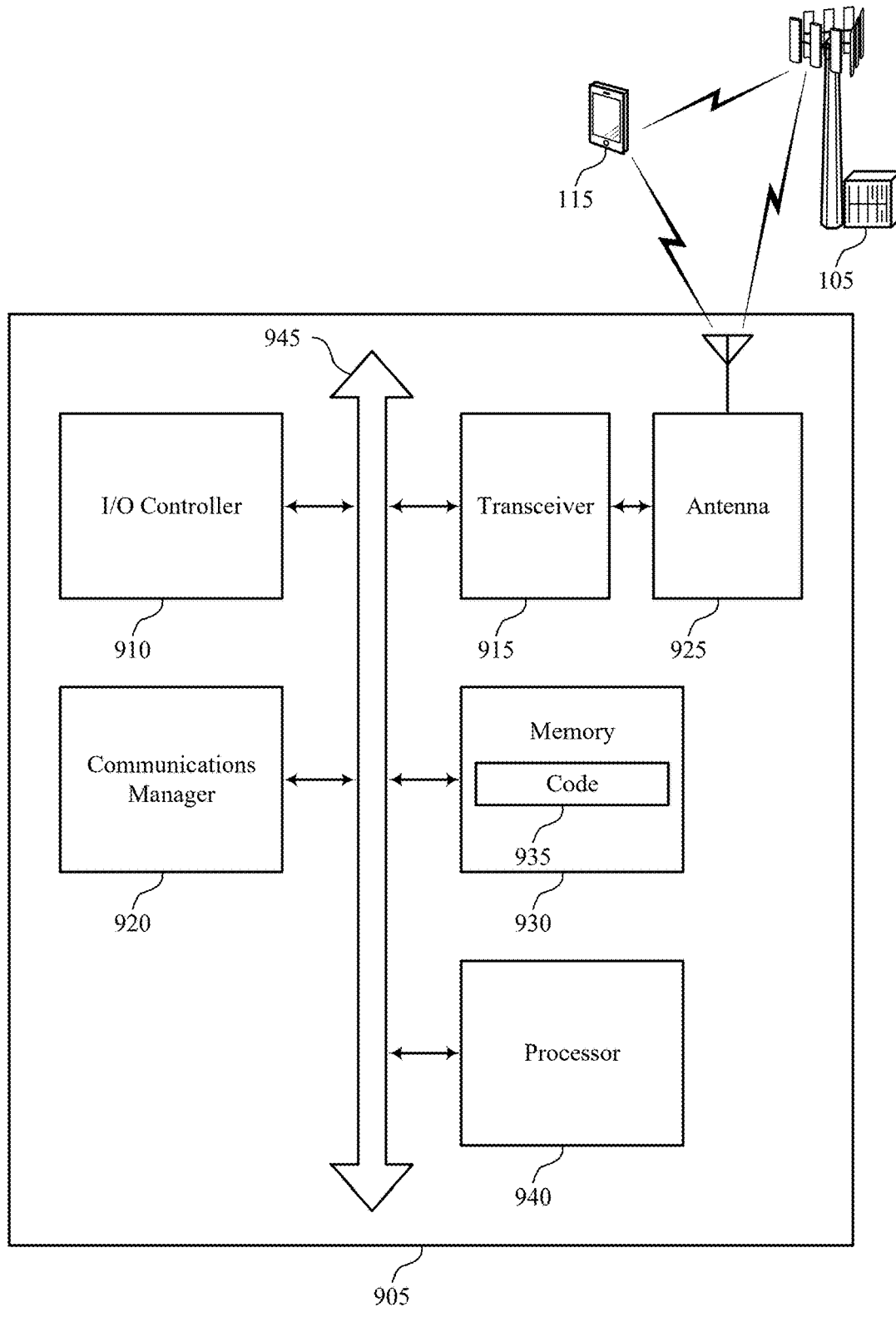
FIG. 9 shows a diagram of a system including a device that supports wake-up signal configurations via sidelink channels in accordance with one or more aspects of the present disclosure.

FIG. 9 shows a diagram of a system 900 including a device 905 that supports wake-up signal configurations via sidelink channels in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable, or processor-executable code, such as the code 935. The code 935 may include instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may include, among other things, a basic I/O system (BIOS) which may control basic hardware or software operation such as the interaction with peripheral components or devices.

The at least one processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting wake-up signal configurations via sidelink channels). For example, the device 905 or a component of the device 905 may include at least one processor 940 and at least one memory 930 coupled with or to the at least one processor 940, the at least one processor 940 and the at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions described herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. For example, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code 935 (e.g., processor-executable code) stored in the at least one memory 930 or otherwise, to perform one or more of the functions described herein.

The communications manager 920 may support wireless communications in accordance with examples as disclosed herein. For example, the communications manager 920 is capable of, configured to, or operable to support a means for communicating, with a second UE, a discovery message associated with sidelink exchange of a first configuration and a second configuration between the first UE and the second UE, the first configuration for a wake-up signal for requesting transmission of an on-demand message by a network entity, and the second configuration for one or more channels for communication with the network entity for at least a portion of an on-demand procedure. The communications manager 920 is capable of, configured to, or operable to support a means for communicating, with the second UE in response to the discovery message, one or more control messages to set up a physical sidelink channel between the first UE and the second UE for the sidelink exchange of the first configuration and the second configuration. The communications manager 920 is capable of, configured to, or operable to support a means for communicating, via the physical sidelink channel, an indication of the first configuration of the wake-up signal for requesting the transmission of the on-demand message from the network entity associated with the first configuration, and an indication of the second configuration for the one or more channels for communication with the network entity for at least the portion of the on-demand procedure.

By including or configuring the communications manager 920 in accordance with examples as described herein, the device 905 may support techniques for improved communication reliability, reduced latency, reduced power consumption, more efficient utilization of communication resources, improved coordination between devices, longer battery life, or improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of wake-up signal configurations via sidelink channels as described herein, or the at least one processor 940 and the at least one memory 930 may be otherwise configured to, individually or collectively, perform or support such operations.

FIG. 10 shows a flowchart illustrating a method 1000 that supports wake-up signal configurations via sidelink channels in accordance with one or more aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include communicating, with a second UE, a discovery message associated with sidelink exchange of a first configuration and a second configuration between the first UE and the second UE, the first configuration for a wake-up signal for requesting transmission of an on-demand message by a network entity, and the second configuration for one or more channels for communication with the network entity for at least a portion of an on-demand procedure. The operations of block 1005 may be performed in accordance with examples as disclosed herein. In some examples, aspects of the operations of 1005 may be performed by a discovery component 825 as described with reference to FIG. 8.

At 1010, the method may include communicating, with the second UE in response to the discovery message, one or more control messages to set up a physical sidelink channel between the first UE and the second UE for the sidelink exchange of the first configuration and the second configuration. The operations of block 1010 may be performed in accordance with examples as disclosed herein. In some examples, aspects of the operations of 1010 may be performed by a channel control component 830 as described with reference to FIG. 8.

At 1015, the method may include communicating, via the physical sidelink channel, an indication of the first configuration of the wake-up signal for requesting the transmission of the on-demand message from the network entity associated with the first configuration, and an indication of the second configuration for the one or more channels for communication with the network entity for at least the portion of the on-demand procedure. The operations of block 1015 may be performed in accordance with examples as disclosed herein. In some examples, aspects of the operations of 1015 may be performed by a configuration component 835 as described with reference to FIG. 8.

FIG. 11 shows a flowchart illustrating a method 1100 that supports wake-up signal configurations via sidelink channels in accordance with one or more aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include communicating, with a second UE, a discovery message associated with sidelink exchange of a first configuration and a second configuration between the first UE and the second UE, the first configuration for a wake-up signal for requesting transmission of an on-demand message by a network entity, and the second configuration for one or more channels for communication with the network entity for at least a portion of an on-demand procedure. The operations of block 1105 may be performed in accordance with examples as disclosed herein. In some examples, aspects of the operations of 1105 may be performed by a discovery component 825 as described with reference to FIG. 8.

At 1110, the method may include communicating, with the second UE in response to the discovery message, one or more control messages to set up a physical sidelink channel between the first UE and the second UE for the sidelink exchange of the first configuration and the second configuration. The operations of block 1110 may be performed in accordance with examples as disclosed herein. In some examples, aspects of the operations of 1110 may be performed by a channel control component 830 as described with reference to FIG. 8.

At 1115, the method may include communicating, via the physical sidelink channel, an indication of the first configuration of the wake-up signal for requesting the transmission of the on-demand message from the network entity associated with the first configuration, and an indication of the second configuration for the one or more channels for communication with the network entity for at least the portion of the on-demand procedure. The operations of block 1115 may be performed in accordance with examples as disclosed herein. In some examples, aspects of the operations of 1115 may be performed by a configuration component 835 as described with reference to FIG. 8.

At 1120, the method may include transmitting, to the network entity associated with the first configuration, the wake-up signal in accordance with the first configuration of the wake-up signal for requesting the transmission of the on-demand message. The operations of block 1120 may be performed in accordance with examples as disclosed herein. In some examples, aspects of the operations of 1120 may be performed by a signal component 840 as described with reference to FIG. 8.

The following provides an overview of aspects of the present disclosure:

Aspect 1: A method for wireless communications at a first UE, comprising: communicating, with a second UE, a discovery message associated with sidelink exchange of a first configuration and a second configuration between the first UE and the second UE, the first configuration for a wake-up signal for requesting transmission of an on-demand message by a network entity, and the second configuration for one or more channels for communication with the network entity for at least a portion of an on-demand procedure; communicating, with the second UE in response to the discovery message, one or more control messages to set up a physical sidelink channel between the first UE and the second UE for the sidelink exchange of the first configuration and the second configuration; and communicating, via the physical sidelink channel, an indication of the first configuration of the wake-up signal for requesting the transmission of the on-demand message from the network entity associated with the first configuration, and an indication of the second configuration for the one or more channels for communication with the network entity for at least the portion of the on-demand procedure.

Aspect 2: The method of aspect 1, wherein the indication of the first configuration is received from the second UE, the method further comprising: transmitting, to the network entity associated with the first configuration, the wake-up signal in accordance with the first configuration of the wake-up signal for requesting the transmission of the on-demand message.

Aspect 3: The method of aspect 2, further comprising: receiving the on-demand message from the network entity; and transmitting, in response to the on-demand message, a random access signal to the network entity.

Aspect 4: The method of any of aspects 1 through 3, wherein the on-demand message indicates a synchronization signal block or a system information block.

Aspect 5: The method of any of aspects 1 through 4, wherein the physical sidelink channel is a PSCCH, a PSSCH, or a PSBCH.

Aspect 6: The method of any of aspects 1 through 5, wherein the discovery message indicates a capability to provide the first configuration of the wake-up signal associated with the network entity.

Aspect 7: The method of aspect 6, wherein the discovery message is communicated via a PSCCH, and the indication of the first configuration of the wake-up signal is communicated via a PSSCH.

Aspect 8: The method of any of aspects 1 through 5, wherein the discovery message indicates a request for the first configuration of the wake-up signal associated with the network entity.

Aspect 9: The method of any of aspects 1 through 8, wherein the first configuration indicates a resource for the wake-up signal or a transmission timing of the wake-up signal based at least in part on a timing of the discovery message, of the one or more control messages, or of the indication of the first configuration of the wake-up signal.

Aspect 10: The method of any of aspects 1 through 9, wherein the indication of the first configuration of the wake-up signal is transmitted to the second UE or is received from the second UE.

Aspect 11: The method of any of aspects 1 through 10, wherein the second configuration indicates a RACH configuration or a PDCCH configuration.

Aspect 12: A first UE for wireless communications, comprising one or more memories storing processor-executable code, and one or more processors coupled with the one or more memories and individually or collectively operable to execute the code to cause the first UE to perform a method of any of aspects 1 through 11.

Aspect 13: A first UE for wireless communications, comprising at least one means for performing a method of any of aspects 1 through 11.

Aspect 14: A non-transitory computer-readable medium storing code for wireless communications, the code comprising instructions executable by one or more processors to perform a method of any of aspects 1 through 11.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first user equipment (UE), comprising:
one or more memories storing processor-executable code; and
one or more processors coupled with the one or more memories and individually or collectively operable to execute the code to cause the first UE to:
communicate, with a second UE, a discovery message associated with sidelink exchange of a first configuration and a second configuration between the first UE and the second UE, the first configuration for a wake-up signal for requesting transmission of an on-demand message by a network entity, and the second configuration for one or more channels for communication with the network entity for at least a portion of an on-demand procedure;
communicate, with the second UE in response to the discovery message, one or more control messages to set up a physical sidelink channel between the first UE and the second UE for the sidelink exchange of the first configuration and the second configuration; and
communicate, via the physical sidelink channel, an indication of the first configuration of the wake-up signal for requesting the transmission of the on-demand message from the network entity associated with the first configuration, and an indication of the second configuration for the one or more channels for communication with the network entity for at least the portion of the on-demand procedure.

2. The first UE of claim 1, wherein the indication of the first configuration is received from the second UE, and the one or more processors are individually or collectively further operable to execute the code to cause the first UE to:
transmit, to the network entity associated with the first configuration, the wake-up signal in accordance with the first configuration of the wake-up signal for requesting the transmission of the on-demand message.

3. The first UE of claim 2, wherein the one or more processors are individually or collectively further operable to execute the code to cause the first UE to:
receive the on-demand message from the network entity; and
transmit, in response to the on-demand message, a random access signal to the network entity.

4. The first UE of claim 1, wherein:
the on-demand message indicates a synchronization signal block or a system information block.

5. The first UE of claim 1, wherein:
the physical sidelink channel is a physical sidelink control channel (PSCCH), a physical sidelink shared channel (PSSCH), or a physical sidelink broadcast channel (PSBCH).

6. The first UE of claim 1, wherein:
the discovery message indicates a capability to provide the first configuration of the wake-up signal associated with the network entity.

7. The first UE of claim 6, wherein:
the discovery message is communicated via a physical sidelink control channel (PSCCH), and the indication of the first configuration of the wake-up signal is communicated via a physical sidelink shared channel (PSSCH).

8. The first UE of claim 1, wherein:

the discovery message indicates a request for the first configuration of the wake-up signal associated with the network entity.

9. The first UE of claim 1, wherein:

the first configuration indicates a resource for the wake-up signal or a transmission timing of the wake-up signal based at least in part on a timing of the discovery message, of the one or more control messages, or of the indication of the first configuration of the wake-up signal.

10. The first UE of claim 1, wherein:

the indication of the first configuration of the wake-up signal is transmitted to the second UE or is received from the second UE.

11. The first UE of claim 1, wherein:

the second configuration indicates a random access channel (RACH) configuration or a physical downlink control channel (PDCCH) configuration.

12. A method for wireless communications at a first user equipment (UE), comprising:

communicating, with a second UE, a discovery message associated with sidelink exchange of a first configuration and a second configuration between the first UE and the second UE, the first configuration for a wake-up signal for requesting transmission of an on-demand message by a network entity, and the second configuration for one or more channels for communication with the network entity for at least a portion of an on-demand procedure;

communicating, with the second UE in response to the discovery message, one or more control messages to set up a physical sidelink channel between the first UE and the second UE for the sidelink exchange of the first configuration and the second configuration; and communicating, via the physical sidelink channel, an indication of the first configuration of the wake-up signal for requesting the transmission of the on-demand message from the network entity associated with the first configuration, and an indication of the second configuration for the one or more channels for communication with the network entity for at least the portion of the on-demand procedure.

13. The method of claim 12, wherein the indication of the first configuration is received from the second UE, the method further comprising:

transmitting, to the network entity associated with the first configuration, the wake-up signal in accordance with the first configuration of the wake-up signal for requesting the transmission of the on-demand message.

14. The method of claim 13, further comprising:

receiving the on-demand message from the network entity; and transmitting, in response to the on-demand message, a random access signal to the network entity.

15. The method of claim 12, wherein:

the on-demand message indicates a synchronization signal block or a system information block.

16. The method of claim 12, wherein:

the physical sidelink channel is a physical sidelink control channel (PSCCH), a physical sidelink shared channel (PSSCH), or a physical sidelink broadcast channel (PSBCH).

17. The method of claim 12, wherein:

the discovery message indicates a capability to provide the first configuration of the wake-up signal associated with the network entity.

18. The method of claim 17, wherein:

the discovery message is communicated via a physical sidelink control channel (PSCCH), and the indication of the first configuration of the wake-up signal is communicated via a physical sidelink shared channel (PSSCH).

19. The method of claim 12, wherein:

the discovery message indicates a request for the first configuration of the wake-up signal associated with the network entity.

20. A non-transitory computer-readable medium storing code for wireless communications, the code comprising instructions executable by one or more processors to:

communicate, with a second user equipment (UE), a discovery message associated with sidelink exchange of a first configuration and a second configuration between a first UE and the second UE, the first configuration for a wake-up signal for requesting transmission of an on-demand message by a network entity, and the second configuration for one or more channels for communication with the network entity for at least a portion of an on-demand procedure;

communicate, with the second UE in response to the discovery message, one or more control messages to set up a physical sidelink channel between the first UE and the second UE for the sidelink exchange of the first configuration and the second configuration; and communicate, via the physical sidelink channel, an indication of the first configuration of the wake-up signal for requesting the transmission of the on-demand message from the network entity associated with the first configuration, and an indication of the second configuration for the one or more channels for communication with the network entity for at least the portion of the on-demand procedure.

* * * * *